(12) United States Patent
King et al.

(10) Patent No.: US 8,991,049 B2
(45) Date of Patent: Mar. 31, 2015

(54) SYSTEMS AND METHODS FOR INSTALLING SOLAR ENERGY SYSTEMS

(71) Applicant: Combined Power LLC, Santee, CA (US)

(72) Inventors: John D. H. King, La Jolla, CA (US); Nicholas A. Kramer, Lakeside, CA (US)

(73) Assignee: Combined Power LLC, La Jolla, CA (US)

( * ) Notice: Subject to any disclaimer, the term of this patent is extended or adjusted under 35 U.S.C. 154(b) by 283 days.

(21) Appl. No.: 13/715,564

(22) Filed: Dec. 14, 2012

(65) Prior Publication Data

US 2013/0152393 A1    Jun. 20, 2013

Related U.S. Application Data

(60) Provisional application No. 61/576,513, filed on Dec. 16, 2011.

(51) Int. Cl.
   *B23P 15/36*      (2006.01)
   *B21D 53/02*     (2006.01)
   *B23P 11/00*     (2006.01)
   *F24J 2/52*       (2006.01)
   *F24J 2/54*       (2006.01)

(52) U.S. Cl.
   CPC ............. *B23P 11/00* (2013.01); *F24J 2/5267* (2013.01); *F24J 2/541* (2013.01); *F24J 2002/5451* (2013.01); *Y02E 10/47* (2013.01)
   USPC ..................................... 29/890.033

(58) Field of Classification Search
   CPC ............ B23P 11/00; F24J 2/04; F24J 2/5267; F24J 2/541; F24J 2002/5451; F24J 2002/5281; F24J 2002/5284; F24J 2/1057; F24J 2/24; F24J 2/242; Y02E 10/47
   USPC ........................ 29/890.033; 62/235.1; 165/59
   See application file for complete search history.

(56) References Cited

U.S. PATENT DOCUMENTS

| 2011/0070635 | A1* | 3/2011 | King et al. | 435/292.1 |
| 2012/0234668 | A1* | 9/2012 | King et al. | 204/157.5 |
| 2013/0306139 | A1* | 11/2013 | Bostwick | 136/248 |
| 2014/0283815 | A1* | 9/2014 | Watts | 126/585 |

\* cited by examiner

*Primary Examiner* — Alexander P Taousakis
(74) *Attorney, Agent, or Firm* — Eric L. Lane; Green Patent Law

(57) ABSTRACT

A method of installing a solar energy system comprises laying an uninflated elongated tube of flexible material in a substantially flat configuration, winding the uninflated elongated tube on a spool, transporting the spool with the elongated tube, and filling the elongated tube with a gas and/or liquid such that the elongated tube inflates with the gas and/or liquid and unrolls from the spool.

3 Claims, 2 Drawing Sheets

SYSTEMS AND METHODS FOR INSTALLING SOLAR ENERGY SYSTEMS

CROSS-REFERENCE TO RELATED APPLICATION

This application is a non-provisional of and claims priority to U.S. Application Ser. No. 61/576,513, filed Dec. 16, 2011, which is hereby incorporated by reference in its entirety.

FIELD OF THE DISCLOSURE

The present disclosure relates to installation methods for solar energy systems.

BACKGROUND OF THE DISCLOSURE

There has been a long-standing need to provide energy generation from renewable sources. Various renewable energy sources have been pursued, such as solar energy, wind, geothermal, and biomass for biofuels as well as others. There also exists an ever-increasing need for cost effective, large scale installation techniques and technologies for renewable energy systems.

Various approaches have been taken to achieve cost effective installation of solar energy generation systems. To that end, much focus has been directed to creating standardized parts and simplified designs that reduce the effort and expense of building a solar energy installation. One example of a simplified solar energy system is a Compact Linear Fresnel Reflector (CLFR) system.

However, all such efforts still result in significant up front expense in both labor and equipment related to installation of solar energy systems.

It should be appreciated that there remains a need for improved systems and methods for installing solar energy generating systems. The present disclosure fulfills these needs and others.

Accordingly, methods of installing solar energy systems are provided which require minimum labor and facilitate inexpensive storage and transport. These and other features of the disclosed embodiments will be appreciated from review of the detailed description, along with the accompanying figures in which like reference numbers refer to like parts throughout.

SUMMARY AND DETAILED DESCRIPTION

In general terms, the present disclosure provides systems and methods for installing a solar reflector assembly useable for generating energy from solar radiation. Embodiments of the solar reflector assemblies are inflatable elongated tubes of flexible material with each tube including a reflective sheet to reflect solar radiation to a solar collector, e.g., as described in U.S. application Ser. No. 12/849,761, filed Aug. 3, 2010, U.S. application Ser. No. 12/889,279, filed Sep. 23, 2010, and U.S. application Ser. No. 12/950,931, filed Nov. 19, 2010, each of which is hereby incorporated by reference in its entirety.

Figure 1:
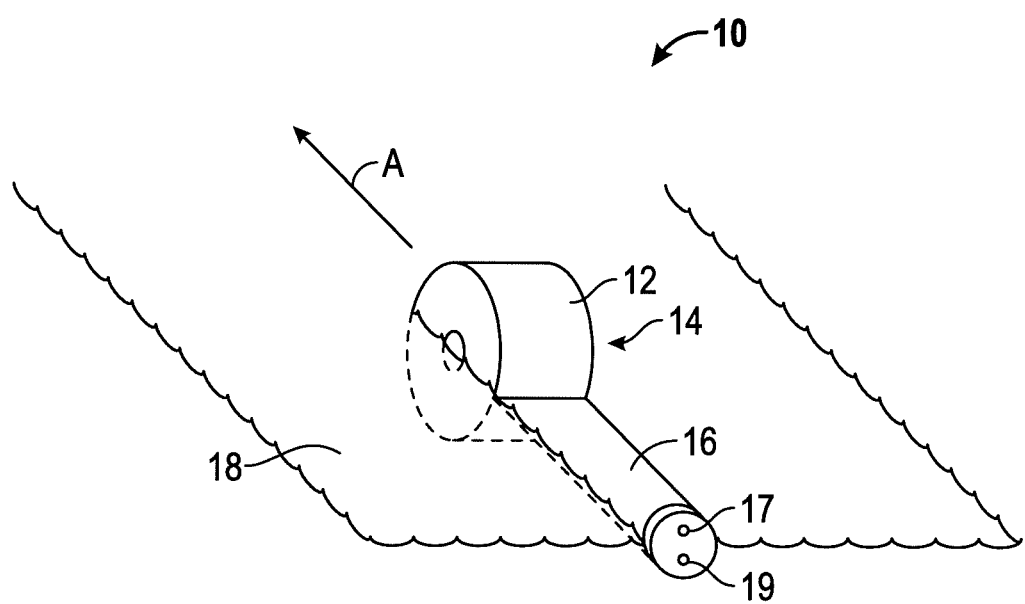
FIG. 1 is a perspective view of an embodiment of a method of installing a solar energy system in accordance with the present disclosure.

The solar reflector assembly 10 itself, since it is made of flexible plastic material 12, can be made to lay flat when not pressurized with gas or liquid. As shown in FIG. 1, this "lay-flat" configuration can be made to be wound up on a spool 14, such that a relatively long length of the reflector system 10 can be stored in a compact, lightweight configuration. These spools 14 can then be transported to a project site composed of liquid filled basins 18 and connected to a supply of gas and/or liquid. The gas and/or liquid supply can be turned on, thus filling the tubing 16 with gas and/or liquid via gas inlet 17 and/or liquid inlet 19.

Figure 2:
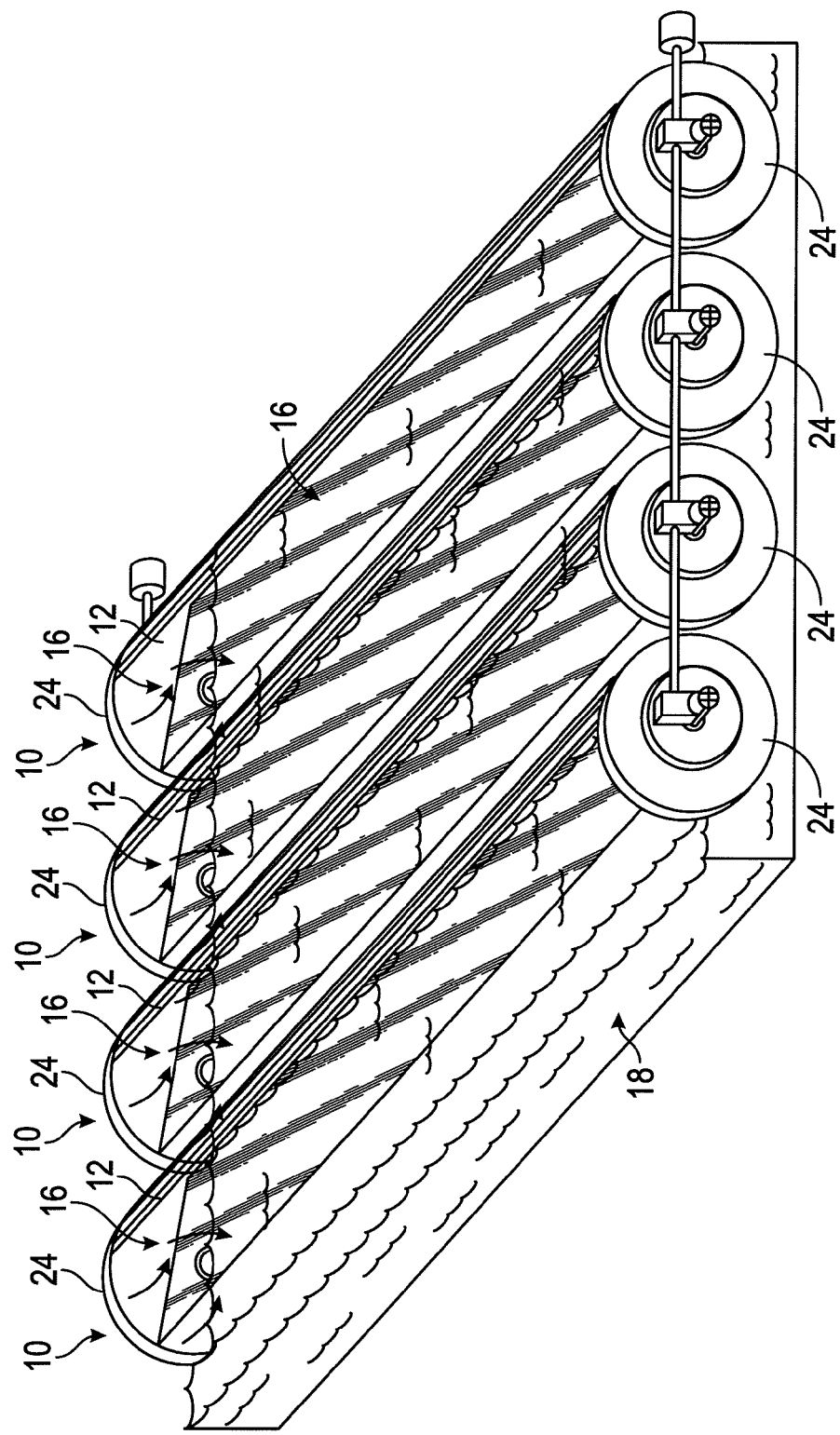
FIG. 2 is a perspective view of an embodiment of a solar energy system installed in accordance with the present disclosure.

This method of filling the tubes 16 will cause the spool system to extend out from the original connection point in a straight line in the direction indicated in arrow A. The spool 14 will rotate as it does this and leave the lay-flat tubing 16 filled behind it, filled with gas and/or liquid. From the reference frame of the spool 14, the lay-flat tubing 16 is unrolling off of it. The system itself can be assembled at the factory where the tubing is made, and the spool can be reused over and over again. The method requires only the labor of connecting the lay-flat tubing to the gas and/or liquid supply at one end of the basin, and recovering the fully unrolled tube at the other end, removing the now fully unwound spool, and connecting the tubing, if necessary to any support system 24 at the other end, as seen in FIG. 2.

It should be understood that any of the foregoing configurations and specialized components or chemical compounds may be interchangeably used with any of the systems of the preceding embodiments. Although illustrative embodiments are described hereinabove, it will be evident to one skilled in the art that various changes and modifications may be made therein without departing from the disclosed embodiments. It is intended in the appended claims to cover all such changes and modifications that fall within the true spirit and scope of the disclosure.

The invention claimed is:

1. A method of installing a solar energy system, comprising:
   laying an uninflated elongated tube of flexible material in a substantially flat configuration;
   winding the uninflated elongated tube on a spool;
   transporting the spool with the elongated tube; and
   filling the elongated tube with a gas and/or liquid such that the elongated tube inflates with the gas and/or liquid and unrolls from the spool.

2. The method of claim 1 further comprising removing the spool from the elongated tube.

3. The method of claim 2 further comprising connecting the elongated tube to a support system.

* * * * *